July 12, 1955 W. C. SEALEY 2,713,141
TAP CHANGER MOTOR CONTROL SYSTEM WITH SELF-CONTROLLED
THERMAL TIME DELAY RELAY
Filed Nov. 6, 1952 2 Sheets-Sheet 1

Inventor
William C. Sealey
by Didier Journeaux
Attorney

July 12, 1955

W. C. SEALEY 2,713,141

TAP CHANGER MOTOR CONTROL SYSTEM WITH SELF-CONTROLLED
THERMAL TIME DELAY RELAY

Filed Nov. 6, 1952

Inventor
William C. Sealey
by Didier Journeaux
Attorney

United States Patent Office 2,713,141
Patented July 12, 1955

2,713,141

TAP CHANGER MOTOR CONTROL SYSTEM WITH SELF-CONTROLLED THERMAL TIME DELAY RELAY

William C. Sealey, Wauwatosa, Wis., assignor to Allis-Chalmers Manufacturing Company, Milwaukee, Wis.

Application November 6, 1952, Serial No. 319,144

7 Claims. (Cl. 323—43.5)

This invention relates in general to electrical control systems and in particular to an improved motor control system which is operable in response to predetermined change of a condition. It has particular application in controlling the tap changing motor in a step type voltage regulator which utilizes an autotransformer in cooperation with the tap changer to maintain a constant load voltage.

In some prior art step type regulating systems a mechanical time delay relay is provided in the control system for the tap changer actuating means which distinguishes between a momentary overload and overloads of sufficient duration to require a tap change. This relay causes a short time delay between the time a change in regulated load voltage occurs and the time when the change will be compensated for by the tap changer. Attempts have also been made to use thermal relays for this purpose. However, these relays remain energized when the tap changer motor is energized, thereby heating the element until the change is compensated for. The resulting cooling time of the thermal element before it opens the motor contacts allows the tap changer to make extra tap changes which are undesirable since the mechanism overruns.

According to the present invention an improved electrical control system is provided for controlling the operation of a motor, the system utilizing a time delay device comprising a thermal relay which controls its own heating current and the operation of the motor, the heating means being controllable when the tap changing motor is in operation. Further, this time delay device is relatively small, has only one moving part, has no bearings and is subject to a minimum of maintenance.

It is therefore an object of the present invention to provide an improved system which controls the extent of movement of a movable member in response to a predetermined change of a condition.

Another object of the present invention is to provide an improved system which controls the direction and extent of movement of a movable member in response to a change of a condition, a predetermined time after the change has occurred.

A further object of the present invention is to provide an improved system which selects the direction and controls the extent of movement of a movable member in response to a change of a condition.

A still further object of the present invention is to provide an improved system which selects the direction of movement of a movable member in response to a change of a condition and which after a time delay, moves the member a predetermined extent.

A further object of the present invention is to provide an improved system which selects the direction of movement of a movable member in response to a change of a condition and after a first time delay moves the member a predetermined extent and which moves the member another predetermined extent after a second predetermined time less than the first predetermined time if the condition still exists.

Another object of the present invention is to provide an improved system which controls the direction and extent of movement of a movable member in response to a predetermined change of a condition and which reduces the time for two successive movements in the same direction responsive to one condition change to less than the time required for two movements responsive to two successive condition changes.

Objects and advantages other than those mentioned above will be apparent from the following description when read in connection with the drawings in which.

Figure 1:
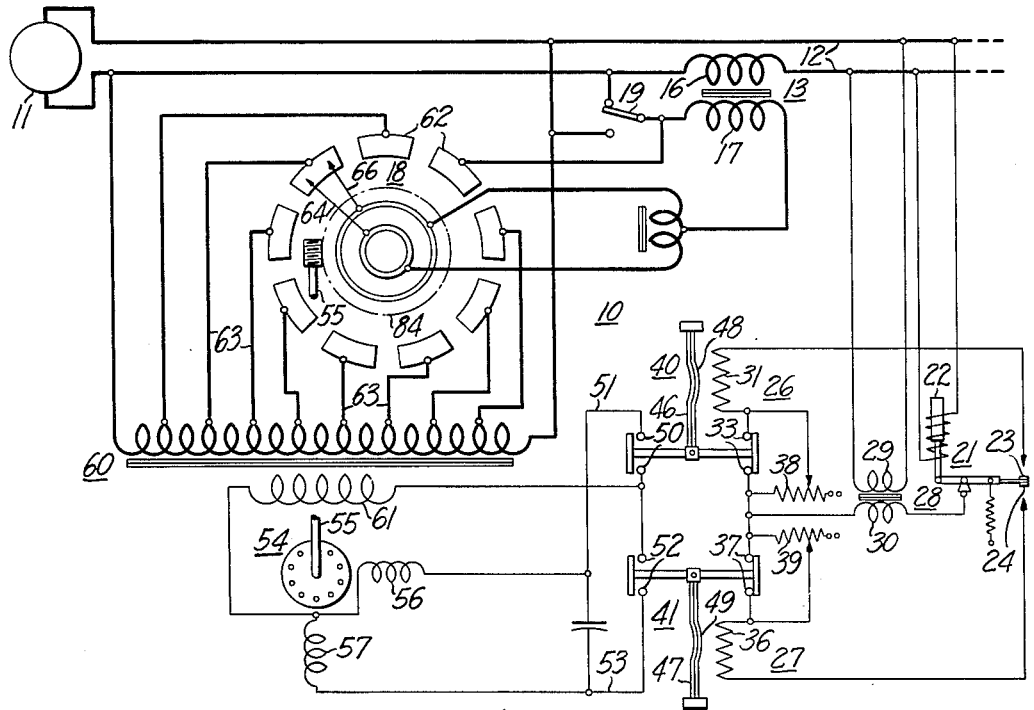
Fig. 1 is a schematic diagram of the control system adapted to control the tap changing motor of a step type voltage regulator.

Referring to the drawing, as shown in Fig. 1 the voltage regulating system 10 generally comprises means for maintaining the voltage supplied by a source of current supply 11 to a load circuit 12 at a constant value independently of changes in load. This regulation is accomplished by adding to the load voltage or subtracting therefrom the voltage of transformer 13 having one winding 16 in the load circuit and the other winding 17 which is supplied through the tap changing switch 18. Winding 17 is connected in boosting or bucking relation to the line voltage dependent upon the position of reversing switch 19.

As shown in Fig. 1, contact making voltmeter 21 is connected directly across load circuit 12 but may also be connected to the load circuit by means of a suitable transformer. Voltmeter 21 has a solenoid 22 responsive to a predetermined change in load voltage and a pair of control contacts 23, 24 to selectively energize control circuits 26, 27, respectively. Control circuit 26 comprises the secondary winding 30 of transformer 28 having its primary winding 29 connected across the load circuit 12 for supplying current to the heating element 31 through auxiliary contacts 33 when contacts 23 of voltmeter 21 closes control circuit 26. Control circuit 27 may have a separate transformer or it may have a transformer common to control circuit 26. As shown in Fig. 1 control circuit 27 comprises common transformer secondary winding 30 to supply current to heating element 36 through auxiliary contacts 37 when contacts 24 of voltmeter 21 closes control circuit 27.

Resistors may be shunted across auxiliary contacts 33 or 37 to control the cooling period of the heating elements but the resistors may be open circuited or omitted altogether. As shown, variable resistors 38, 39 are shunted across contacts 33 and 37, respectively, to control the cooling period of heating elements 31, 36, respectively. When contacts 33 are closed resistor 38 is shorted out of control circuit 26 and when contacts 33 are open resistor 38 is in series with heating element 31.

Thermally operated switch 40 comprises a suitable heat responsive element such as a bimetallic element 46 which is deformably responsive at a predetermined temperature and which upon reaching this temperature opens auxiliary contacts 33 of control circuit 26 and closes main contacts 50 in energizing circuit 51. Thermally operated switch 41 similarly comprises a bimetallic element 47 operable to close main contacts 52 in energizing circuit 53 and open auxiliary contacts 37 in control circuit 27.

Each of the bimetallic elements may be constructed to have a snap movement so that it operates and resets at widely different temperatures, or it may be so constructed that the movement follows all temperature changes. As shown, bimetallic element 46 has a convex shaped portion 48 which changes to a concave portion at a predetermined temperature causing the bimetallic element to operate the contacts with a snap action. Bimetallic element 47 has a similarly shaped portion 49.

Energizing circuit 51 comprises secondary winding 61 of transformer 60 connected to stator winding 56 for supplying current to the reversible motor 54 through main contacts 50 of switch 40 to operate motor 54 in one direction. Energizing circuit 53 may have a separate transformer for supplying current to the motor or it may have a transformer common with circuit 51. As shown circuit 53 has secondary winding 61 of common transformer 60 connected to stator winding 57 of motor 54 through main contacts 52 of switch 41 to operate the motor in another direction.

Figure 2:
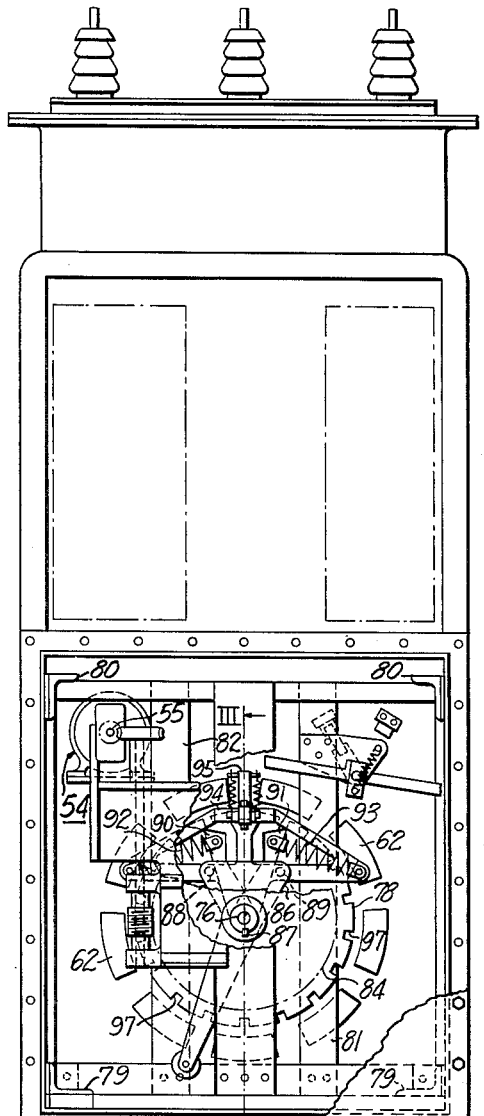
Fig. 2 is the front elevation of the tap changing mechanism shown in Fig. 1.
Figure 3:
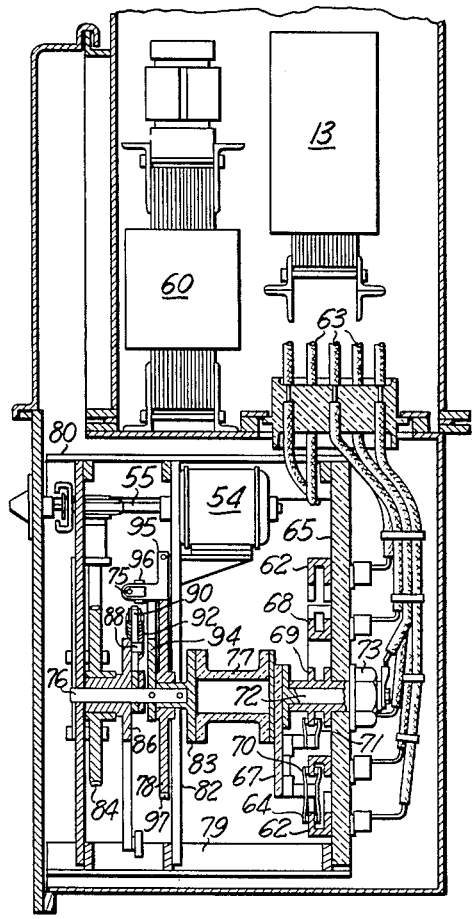
Fig. 3 is a sectional view taken along the line III—III of Fig. 2.

The motor 54 has a shaft 55 which may be adapted to move a member in two directions. As shown in Figs. 1, 2 and 3 the motor is used to operate the tap changing mechanism of the step type voltage regulator. The tap changing mechanism may include a detent mechanism to translate the relatively slow continuous operation of the motor into a rapid snap action or it may include means for driving the mechanism directly. The tap changer here described is in general the type disclosed by U. S. Patent 2,177,109, L. H. Hill, October 24, 1939, Voltage Regulator, which includes a detent mechanism.

The tap changing mechanism has an insulating member 65 upon which is mounted the stationary contacts 62. These contacts are connected to transformer 60 through suitable means such as conductors 63.

The movable contacts 64 and 66 of the tap changer are carried on a movable contact carrying member 67. Each of these contacts comprises two spring held contact pieces, one bearing on one face and the other bearing on the other face of the stationary contacts 62. Movable contacts 64 and 66 are connected respectively to current collecting rings 68 and 69 by means of brushes 70 and 71, respectively. Shaft 72 is clamped rigidly against panel 65 by means of a nut 73 and carries movable contact carrying member 67. Shaft 72 is coupled to shaft 76 by means of insulating coupling 77.

A notched disk 78 is rigidly supported by cross pieces 79 and 80 which are rigidly fastened to two upright members 81, 82. Notched disk 78 forms a bearing for member 83 and coupling 77. Shaft 76 is suitably connected at one end to the member 83 so as to rotate therewith.

Shaft 55 of motor 54 is geared to gear 84 which is mounted on shaft 76. A substantially triangular shaped member 86 is suitably fastened by a key 87 to gear 84 so as to rotate therewith. Gear 84 and triangular shaped member 86 rotate together freely on shaft 76. Also mounted on member 86 are two stops 88 and 89 which move with the member 86 as it moves.

Two arms 90 and 91 are mounted on shaft 76 and rotate freely relative thereto. The arms 90 and 91 cooperate, respectively, with the stops 88 and 89 to apply pressure to springs 92 or 93 connected between the outer ends of arms 90 and 91 and a latch carrying member 94.

Latch member 95 is pivoted at pivot point 75 between upstanding portions of the member 94 and the latch member 95 is biased to the position shown in Fig. 3 by means of a spring as shown in Fig. 2. Latch member 95 carries a bolt 96, the head of which is engaged by the upper surface of arm 90 or 91 to disengage the latch from notches 97 in the disk 78.

The control circuit for the tap changing motor utilized in the voltage regulating system is shown in the neutral or deenergized position in Fig. 1, line 12 being originally in normal condition with respect to voltage. Assuming that a change of load voltage has occurred, the operation is as follows. Solenoid 22 of contact making voltmeter 21 connected across the load circuit 12 selectively closes either contacts 23 or 24 depending on whether an increase or decrease is needed to compensate for the change. Assuming that an increase is needed and solenoid 22 is actuated to close contacts 23, control circuit 26 is thereby closed to supply current to heating element 31 from the secondary winding 30 of transformer 28. The primary winding 29 of transformer 28 is connected across the load circuit 12. The current flowing in circuit 26 through heating element 31 of thermally operated switch 40 causes the element to heat. The heat from element 31 causes the temperature of the bimetallic element 46 to rise above ambient temperature since they are arranged in close proximity to each other. As the temperature of the bimetallic element increases the expansion of the materials on the inner portion of the convex portion 48 causes stresses to be set up in the materials. At a predetermined temperature these stresses caused by unequal expansion of the two materials causes the portion 48 to reverse its shape. This reversal action of the portion 48 causes the bimetallic element to move with a sudden movement which opens contacts 33 and closes contacts 50. Opening of contacts 33 reduces the current in heater 31 so that element 46 begins to cool down. The now concave portion 48 will resume its original shape with the same snap movement after it has cooled to another predetermined temperature.

Closure of contacts 50 in motor energizing circuit 51 causes current to be supplied to stator winding 56 of motor 54 from secondary winding 61 of transformer 60. Energizing stator winding 56 causes the motor to rotate shaft 55 in one direction.

Rotation of the shaft 55 in a clockwise direction slowly rotates the gear 84 and triangular member 86 thereby causing stop 88 to bear against arm 90, thereby placing spring 92 under tension. The shaft 76 and the member 94 do not move at first because latch 95 is in a notch 97 of the disk 78. Upon further rotation of the detent mechanism to substantially 100% of biasing for one full step the stop 88 causes the upper surface of arm 90 to bear against bolt 96 rotating the latch 95 in a counterclockwise direction about its pivot 75, thereby releasing the latch from the notch 97 in the disk 78. The movable contact members are then snapped in a clockwise direction as viewed in Fig. 2 by means of spring 92 and are stopped at the next notch in disk 78 by means of tension placed on spring 93 by arm 90 stopping against the stop 89.

This action increases the voltage of line 12 by one step of the regulator. If the voltage change is compensated for by one tap change, contact making voltmeter 21 opens contacts 23. However, the regulator motor continues to operate to move the detent mechanism over its path of travel toward a second step. After a predetermined time less than the time required by the mechanism to bias 100% over its full path bimetallic element 46 cools down sufficiently to open contacts 50 and recloses contacts 33. Motor 54 is thereby deenergized. The detent mechanism may be constructed to return to its neutral position by means of spring 92 or it may be constructed so that it remains partly biased.

Figure 4:
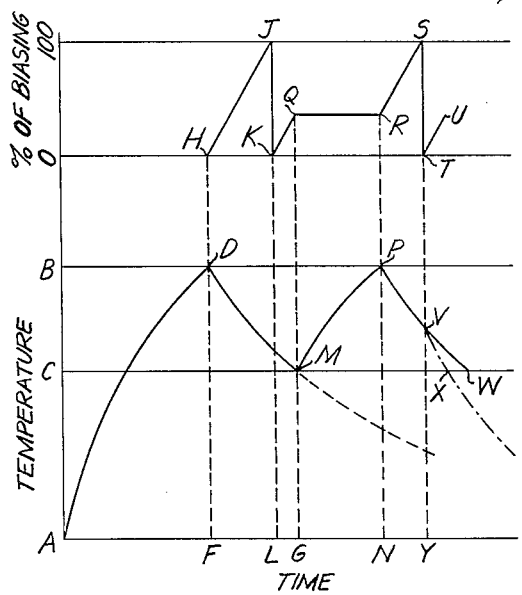
Figs. 4 and 5 are graphs showing the relative time temperature responses of the thermally operated switches shown in Fig. 1.

This cycle is represented graphically in Fig. 4 which shows the relationship of heating time to the temperature of the bimetallic element and the corresponding relationship of cooling time of the elements to percent biasing of the detent mechanism.

In Fig. 4 ordinate A represents the ambient temperature, B the temperature at which portion 48 of bimetallic element 46 changes from its normal convex shape to a concave shape, and C the temperature at which it returns to normal. Curve AD shows the temperature rise of element 46 during the initial heating period AF. Curve DM shows the temperature drop of the element cooling during the period FG. Curve HJ shows relationship of time and percentage of biasing of the detent mechanism. The detent mechanism starts being biased at the same time that the bimetallic element starts to cool. However, the period FL required for full biasing of the mechanism for one step is less than the period FG so that one full tap change occurs. During period LG the detent mechanism starts being biased again as shown by the curve KQ.

In the event that one tap change is not sufficient to compensate for the change in load condition, contact making voltmeter 21 maintains contacts 23 closed. Reclosure of contacts 33 at point M on curve DE restores the full energization of element 31, which reheats the bimetallic element 46 during period GN to temperature B as represented by curve MP in Fig. 4. Since element 46 starts heating at temperature C rather than ambient the period GN required for the element to reach temperature B is less than the period AF. At time N the bimetallic element reopens contacts 33 and recloses contacts 50, causing the motor to be reenergized to result in a second tap change. Element 46 cools along the curve PW and if the load voltage change is then compensated for at time Y, contacts 23 open and fully deenergize heating element 31. Element 46 then cools along the curve VX to temperature C where it returns to its normal shape, and cools further to the ambient temperature A. Because period GN is shorter than the period AF the time required for two successive tap changes in one direction is less than the time required for two nonsuccessive changes.

Figure 5:
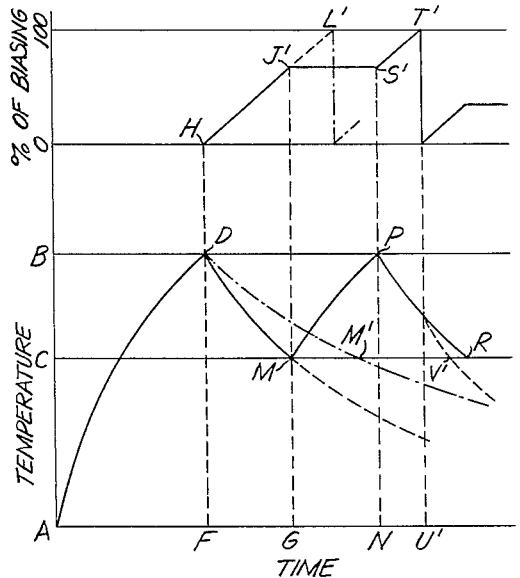

The same thermal relay whose characteristics are represented in Fig. 4 may also be used with detent mechanisms which require a longer time to perform one tap change than the detent mechanism whose characteristics are represented in Fig. 4. The operation of such a mechanism is represented in Fig. 5 in which ordinates A, B and C represents the same temperatures as shown in Fig. 4. Curve AD again shows the temperature of element 46 during the initial heating period AF. Curve DM shows the temperature drop of element 46 during the period FG. Curve HJ' shows relationship of time and percentage of biasing of the detent mechanism. The detent mechanism as before, starts biasing at the same time the bimetallic element starts to cool. However, the period required for the mechanism to bias 100% is greater than the period FG so that a tap change does not occur. When the point M is reached on curve DM contacts 33 reclose and full energization of heating element 31 is restored, and element 46 reheats during the period GN to temperature B as represented by the curve MP in Fig. 5. During the period GN the detent mechanism remains stationary as represented by the line J'S'. When element 46 reaches point P the motor again starts and biases the mechanism to point T' where a tap change occurs at time U'. The motor continues to run until the element 46 reaches temperature C, either at point R if contacts 23 remain closed, or at point V' if contacts 23 open after the tap change.

In many cases, operation in this manner is satisfactory. However, improved operation of the system is obtained by increasing the cooling time of element 46 between temperatures B and C. By increasing the resistance of variable resistor 38 the cooling temperature is made to follow a line represented by curve DM' and the detent mechanism is operated along the line HL' resulting in at least one tap change being made during the initial cooling period.

The relay then operates substantially as the relay shown in Fig. 4 but is used with a detent mechanism requiring a longer period of operation than the one shown in Fig. 4.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. In combination, a member adapted to be moved, a motor for moving said member, means for energizing said motor, means for controlling the energizing of said motor comprising a thermally operated switch and a control circuit, said switch comprising main contacts for connecting said motor energizing means to said motor, auxiliary contacts, and a heat responsive element operable at a predetermined temperature to actuate simultaneously said main contacts and said auxiliary contacts, said control circuit comprising said auxiliary contacts, a heating element disposed adjacent to said heat responsive element, a voltage responsive device having first contacts, and current supply means connected in circuit with said heating element through said first contacts and said auxiliary contacts, said device being operable in response to a predetermined change in voltage to connect said current supply means to said heating element to cause said heat responsive element to obtain said predetermined temperature after a predetermined time and actuate simultaneously said main contacts and said auxiliary contacts thereby interrupting said control circuit causing said heat responsive element to cool and energizing said motor causing said member to move.

2. In a regulating system having a plurality of contact positions and movable contacts the combination of, a motor for moving said movable contacts, means for energizing said motor, and means for controlling the energizing of said motor comprising a thermally operated switch and a control circuit, said switch comprising main contacts for connecting said motor energizing means to said motor, auxiliary contacts, and a heat responsive element operable at a predetermined temperature to actuate simultaneously said main contacts and said auxiliary contacts, said control circuit comprising said auxiliary contacts, a heating element disposed adjacent to said heat responsive element, a voltage responsive device having first contacts, and current supply means connected in circuit with said heating element through said first contacts and said auxiliary contacts, said device being operable in response to a predetermined change in voltage to connect said current supply means to said heating element to cause said heat responsive element to obtain said predetermined temperature after a predetermined time and actuate simultaneously said main contacts and said auxiliary contacts thereby interrupting said control circuit causing said heat responsive element to cool and energizing said motor to move said movable contacts.

3. In combination, a member adapted to be moved, means for moving said member with a snap action comprising a motor and a detent mechanism for translating the relative slow uniform continuous operation of said motor into rapid snap action of said member, means for energizing said motor, and means for controlling the energizing of said motor comprising a thermally operated switch and a control circuit, said switch comprising main contacts for connecting said motor energizing means to said motor, auxiliary contacts, and a heat responsive element operable at a predetermined temperature to actuate simultaneously said main contacts and said auxiliary contacts, said control circuit comprising said auxiliary contacts, a heating element disposed adjacent to said heat responsive element, a voltage responsive device having first contacts and current supply means connected in circuit with said heating element through said first contacts and said auxiliary contacts, said device being operable in response to a predetermined change in voltage to connect said current supply means to said heating element to cause said heat responsive element to obtain said predetermined temperature after a predetermined time and actuate simultaneously said main contacts and said auxiliary contacts thereby interrupting said control circuit causing said heat responsive element to cool and energize said motor to bias said detent mechanism to a predetermined extent to move said member with a snap action.

4. In combination, a member adapted to be moved, a motor for moving said member, means for energizing said motor, and means for controlling the energizing of said motor comprising a thermally operated switch and a control circuit, said switch comprising main contacts for connecting said motor energizing means to said motor, auxiliary contacts, and a convex bimetal element operable at a predetermined temperature to actuate simultaneously said main contacts and said auxiliary contacts, said control circuit comprising said auxiliary contacts, a heating element disposed adjacent to said bimetal element, a voltage responsive device having first contacts, and current supply means connected in circuit with said heating element through said first contacts and said auxiliary contacts, said device being operable in response to a predetermined change in voltage to connect said current supply means to said heating element through said auxiliary contacts to cause said convex bimetal element to obtain said predetermined temperature after a predetermined time causing reversal of the convexity of said bimetal element to simultaneously actuate said main contacts and said auxiliary contacts thereby interrupting said control circuit causing said bimetal element to cool, and energizing said motor causing said member to move.

5. In combination, a member adapted to be moved by steps, means for moving said member comprising a motor and a detent mechanism requiring a first predetermined period for translating the relative slow uniform continuous operation of said motor into rapid snap action of said member by one of said steps, means for energizing said motor, and means for controlling the energizing of said motor comprising a thermally operated switch and a control circuit, said switch comprising main contacts for connecting said motor energizing means to said motor, auxiliary contacts, and a bimetallic element operable at a predetermined temperature to simultaneously actuate said main contacts and said auxiliary contacts, said control circuit comprising said auxiliary contacts, a heating element disposed adjacent to said bimetallic element, a voltage responsive device having first contacts, and current supply means connected in circuit with said heating element through said first contacts and said auxiliary contacts, said device being operable in response to a predetermined change in voltage to connect said current supply means to said heating element through said auxiliary contacts to cause said heat responsive element to obtain said predetermined temperature after a predetermined time and actuate simultaneously said main contacts and said auxiliary contacts to interrupt said control circuit for a second predetermined period causing said heat responsive element to cool and energize said motor for said second predetermined period, said first predetermined period being less than said second predetermined period to cause said detent mechanism to move said member by one of said steps with a rapid snap action.

6. In combination, a member adapted to be moved, a motor for moving said member, means for energizing said motor, and means for controlling the energizing of said motor comprising a thermally operated switch and a control circuit, said switch comprising main contacts for connecting said motor energizing means to said motor, auxiliary contacts, and a bimetallic element operable at a predetermined temperature to simultaneously actuate said main contacts and said auxiliary contacts, said control circuit comprising said auxiliary contacts, a heating element disposed adjacent to said heat responsive element, a voltage responsive device having first contacts, current supply means connected in circuit with said heating element through said first contacts and said auxiliary contacts, said device being operable in response to a predetermined change in voltage to connect said current supply means to said heating element through said auxiliary contacts to cause said bimetallic element to obtain said predetermined temperature after a predetermined time and actuate simultaneously said main contacts and said auxiliary contacts to interrupt said control circuit through said auxiliary contacts causing said bimetallic element to cool, and said motor to be energized to move said member, and means for controlling the current in said heating element after actuation of said auxiliary contacts comprising a variable resistor connected in shunt with said auxiliary contacts.

7. In combination, a member adapted to be moved in two directions, a motor for moving said member, means for energizing said motor, and means for controlling the energizing of said motor comprising a first unit for operating said motor in one direction and a second unit for operating said motor in another direction, each said unit comprising a thermally operated switch and a control circuit, said switch comprising main contacts operable to connect said motor energizing means to said motor, auxiliary contacts, a bimetallic element operable at a predetermined temperature to directly actuate said main contacts and said auxiliary contacts, said control circuit comprising said auxiliary contacts, a heating element disposed adjacent to said bimetallic element, a voltage responsive device having first contacts, and current supply means connected in circuit with said heating element through said first contacts and said auxiliary contacts, said device being operable in response to a predetermined change in voltage to connect said current supply means to said heating element to cause said bimetallic element to obtain said predetermined temperature and directly actuate said main contacts and said auxiliary contacts to interrupt said control circuit causing said bimetallic element to cool for a predetermined time and energizing said motor for said predetermined time to move said member in one of said two directions.

References Cited in the file of this patent

UNITED STATES PATENTS

| | | |
|---|---|---|
| 2,177,109 | Hill | Oct. 24, 1939 |
| 2,180,164 | Minneci | Nov. 14, 1939 |
| 2,445,450 | Narbutovskih | July 20, 1948 |

FOREIGN PATENTS

| | | |
|---|---|---|
| 410,017 | Great Britain | May 10, 1934 |